United States Patent
Ezrielev et al.

(10) Patent No.: US 12,321,488 B2
(45) Date of Patent: Jun. 3, 2025

(54) SYSTEM AND METHOD FOR DATA ACCESS MANAGEMENT USING AUXILIARY DEVICES

(71) Applicant: Dell Products L.P., Round Rock, TX (US)

(72) Inventors: Ofir Ezrielev, Beer Sheva (IL); Naor Radami, Shokeda (IL); Amos Zamir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 274 days.

(21) Appl. No.: 18/175,675

(22) Filed: Feb. 28, 2023

(65) Prior Publication Data

US 2024/0289488 A1 Aug. 29, 2024

(51) Int. Cl.
*G06F 21/62* (2013.01)
*G06F 21/33* (2013.01)
*G06F 21/60* (2013.01)

(52) U.S. Cl.
CPC .......... *G06F 21/6245* (2013.01); *G06F 21/33* (2013.01); *G06F 21/602* (2013.01)

(58) Field of Classification Search
CPC ..... G06F 21/33; G06F 21/602; G06F 21/6245
See application file for complete search history.

(56) References Cited

U.S. PATENT DOCUMENTS

| | | | |
|---|---|---|---|
| 12,088,697 B1 * | 9/2024 | Angara | H04L 9/3228 |
| 12,182,302 B1 * | 12/2024 | Haslam | H04W 12/33 |
| 2003/0165240 A1 | 9/2003 | Bantz et al. | |
| 2013/0124859 A1 * | 5/2013 | Pestoni | H04L 63/065 380/282 |
| 2024/0146986 A1 * | 5/2024 | Alvarez | H04N 21/835 |

OTHER PUBLICATIONS

"Learn about Conditional Access and Intune," Microsoft, Web Page <https://learn.microsoft.com/en-us/mem/intune/protect/conditional-access> accessed on Nov. 2, 2022 (2 Pages).

(Continued)

*Primary Examiner* — Mohamed A. Wasel
(74) *Attorney, Agent, or Firm* — WOMBLE BOND DICKINSON (US) LLP

(57) ABSTRACT

Methods and systems for managing access to data stored in data storage systems are disclosed. To prevent malicious parties from gaining access to sensitive data stored in a data storage system, an access control system may be implemented. The access control system may include a registration process that assigns cryptographic key pairs to registered combinations of users and devices. The combinations may include an end device, a user of the end device, and an auxiliary device associated with the end device (e.g., a display device). When an end device requests sensitive data, the requesting device (e.g., end device), an associated user, and an associated display device may be authenticated using the key pairs generated during registration. The sensitive data may be encrypted pre-transit using device-specific encryption (e.g., using a public key of the display device) to protect sensitive data from malicious parties that may gain access to the end device.

20 Claims, 5 Drawing Sheets

(56) References Cited

OTHER PUBLICATIONS

"Common ways to use Conditional Access with Intune," Microsoft, Web Page <https://learn.microsoft.com/en-us/mem/intune/protect/conditional-access-intune-common-ways-use> accessed on Nov. 2, 2022 (6 Pages).

"Create a device-based Conditional Access policy," Microsoft, Web Page <https://learn.microsoft.com/en-us/mem/intune/protect/create-conditional-access-intune> accessed on Nov. 2, 2022 (5 Pages).

"Add Endpoint protection settings in Intune," Microsoft, Web Page <https://learn.microsoft.com/en-us/mem/intune/protect/endpoint-protection-configure> accessed on Nov. 2, 2022 (4 Pages).

"Set up the Certificate Connector for Microsoft Intune to support the DigiCert PKI Platform," Microsoft, Web Page <https://learn.microsoft.com/en-us/mem/intune/protect/certificates-digicert-configure> accessed on Nov. 2, 2022 (12 Pages).

"How Windows uses the Trusted Platform Module," Microsoft, Web Page <https://learn.microsoft.com/en-us/windows/security/information-protection/tpm/how-windows-uses-the-tpm> accessed on Nov. 2, 2022 (13 Pages).

"Application Guard for Office," Microsoft, Web Page <https://support.microsoft.com/en-us/office/application-guard-for-office-9e0fb9c2-ffad-43bf-8ba3-78f785fdba46> accessed on Nov. 2, 2022 (6 Pages).

\* cited by examiner

SYSTEM AND METHOD FOR DATA ACCESS MANAGEMENT USING AUXILIARY DEVICES

FIELD

Embodiments disclosed herein relate generally to data access management. More particularly, embodiments disclosed herein relate to systems and methods to manage secure access to sensitive data.

BACKGROUND

Computing devices may provide computer implemented services. The computer implemented services may be used by users of the computing devices and/or devices operably connected to the computing devices. Computing devices may utilize sensitive data when providing computer implemented services. Computer security measures may be implemented to protect sensitive data while performing the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
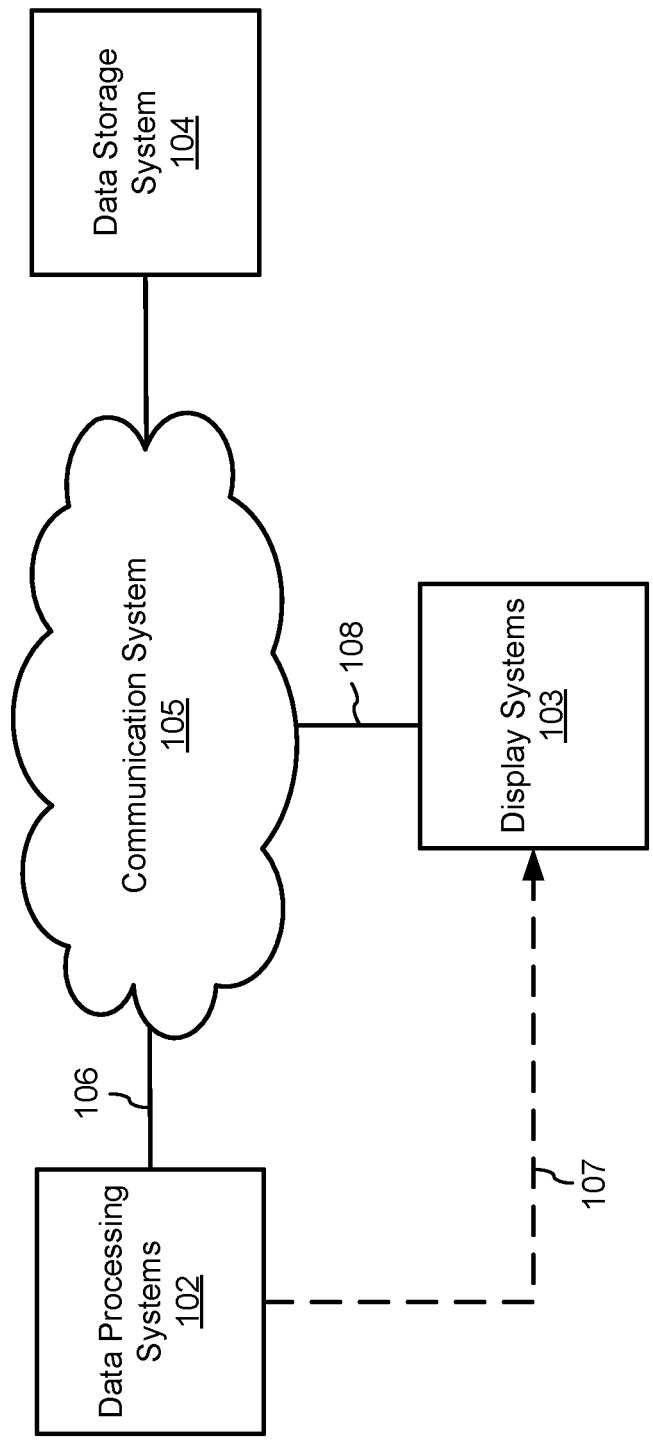
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing access to data stored in a data storage system. A data storage system may be used to store sensitive data, to which malicious parties may attempt to gain access. The security of this sensitive data may depend on data security measures (e.g., access control measures) implemented around the data storage system.

For example, access control measures such as user authentication (e.g., username and password combinations) may be implemented. However, a malicious party may gain access to the credentials of an authorized user, allowing the malicious party to gain access to the user's end device and any sensitive data transferred to the end device from data storage.

To increase the security of sensitive data, additional security access mechanisms may be implemented. The additional mechanisms may include a security registration process for combinations of users and the devices of users (e.g., end devices and/or auxiliary devices associated with end devices).

The registration process may assign cryptographic key pairs to registered user-device combinations (e.g., a user, the end device of a user, and/or the display device associated with the end device). If a user of an end device with associated display device requests sensitive data from the data storage system, the assigned key pairs may be used to authenticate the user-device combination. Additionally, before providing the user with the sensitive data, the sensitive data may be encrypted using device-specific encryption (e.g., using a key pair established during registration).

The encrypted data may be transmitted to the display device where an independent decryption process may be initiated by the user. The decryption process may be performed using a key stored on the display device (e.g., established during registration), thereby protecting the sensitive data from a malicious party that may gain access to the end device.

By doing so, an improved computing device and/or distributed system may be obtained. The improved device and/or system may prevent malicious parties from accessing sensitive data required to provide the computer implemented services.

In an embodiment, a computer implemented method for managing access to data stored in a data storage system is provided. The method may include: obtaining a data access request for a portion of the data from a requesting device; and, making, using at least in part a second key pair associated with the requesting device, a display device associated with the requesting device, and a user, a first determination regarding whether the requesting device and the user of the requesting device can be validated.

In a first instance of the first determination, where both the requesting device and the user are validated, the method may include making a second determination regarding whether the portion of the data comprises sensitive data.

In a first instance of the second determination, where the portion of the data includes the sensitive data, the method may include: identifying a portion of a first key pair associated with the requesting device, the display device, and the user; encrypting the sensitive data of the portion of the data using the portion of the first key pair to obtain encrypted data; and, providing at least the encrypted data to the display device, to provide the user with access to the sensitive data and screen the sensitive data from the requesting device.

The method may also include, prior to obtaining the data access request, performing a registration process for the user, the requesting device, and the display device with respect to the data storage system, the registration process obtaining the first key pair and the second key pair, and distributing portions of the first key pair to the display device and the data storage system, and distributing portions of the second key pair to the requesting device and the data storage system.

Distributing the portions of the first key pair may include obtaining a first public key certificate based on a first public key of the first key pair and providing the first public key certificate to the data storage system, the data storage system associating the first public key certificate with the requesting device, the display device, and the user.

The first key pair may be established through the registration process of the display device with the data storage system.

The portion of the second key pair may include a second public key stored in a second public key certificate, the second public key certificate facilitating validation of the second public key.

Providing the at least the encrypted data to the display device may include transmitting the at least the encrypted data via a transmission path that does not include the requesting device.

The display device may be registered with the data storage system prior to obtaining the data access request.

Providing at least the encrypted data may include sending the encrypted data via a secure communication channel.

The method may also include, in a second instance of the first determination, where at least one of the requesting device and the user are not validated, denying the data access request.

The method may further include, in a second instance of the second determination, where the portion of the data does not include the sensitive data, providing the portion of the data to the requesting device.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a distributed system in accordance with an embodiment is shown. The system shown in FIG. 1 may provide computer implemented services. The system may include data processing systems 102, display systems 103, and data storage system 104. Data processing systems 102 may include any number of computing devices that may independently and/or cooperatively provide the computer implemented services.

For example, all, or a portion, of data processing systems 102 may provide computer implemented services to users and/or other computing devices operably connected to data processing systems 102. The computer implemented services may include any type and quantity of services including, for example, database services, instant messaging services, video conferencing services, etc. Different systems may provide similar and/or different computer implemented services.

To provide the computer implemented services, data processing systems 102 may host applications that provide these (and/or other) computer implemented services. The applications may be hosted by one or more of data processing systems 102. One or more of data processing systems 102 may access data stored in data storage system 104 (e.g., via operable connection 106) and/or display accessed data on display systems 103 in order to provide all or a portion of the computer implemented services.

Display systems 103 may include any number of auxiliary devices operably connected to one or more of data processing systems 102. Display systems 103 may include a data processing system that operates independently from data processing systems 102. For example, the auxiliary devices may output data in a visual and/or tactile form if implemented using monitors, mobile displays, projectors, etc., and/or provide other types of functions if implemented using other types of auxiliary devices such as printers, keyboards, mice, etc. . . .

Any of display systems 103 may independently and/or cooperatively display data received through an operable connection to another device. For example, a display system of display systems 103 may display information received from any of data processing systems 102 via operable connection 107.

Any of data processing systems 102 and components thereof, as well as hosted entities (e.g., applications that provide computer implemented services, other applications that manage the operation of data processing systems 102, etc.), may be subject to attacks performed by malicious parties. For example, a malicious party may gain access to any of data processing systems 102 (e.g., by compromising user credentials, passwords, and/or other type of access control data). If the malicious party gains access to any of data processing systems 102, the malicious party may gain access to data accessible by the data processing systems.

Consequently, if any of data processing systems 102 are able to access data stored in data storage system 104 while compromised, the data stored in data storage system 104 may also be compromised.

Data storage system 104 may store sensitive data and/or insensitive data. Data storage system 104 may obtain data access requests for data (e.g., including sensitive data) from any of data processing systems 102, and may, in turn, provide the requested data to data processing systems 102.

In general, embodiments disclosed herein may provide systems, devices, and methods for managing access to sensitive data by implementing data access security control mechanisms. The access control mechanisms may limit access to data stored in data storage system 104. The access may be limited through device-specific encryption of the data, registration processes, and/or redirection of data from requesting entities to other entities. By doing so, sensitive data from data storage system 104 that is accessed by a compromised data processing system may be less likely to be divulged to malicious parties by virtue of the data access limiting framework implemented by the system.

To provide its functionality, data storage system 104 may implement the registration processes, the device-specific encryption, and/or redirection of data from requesting entities to other associated entities.

Figure 2A:
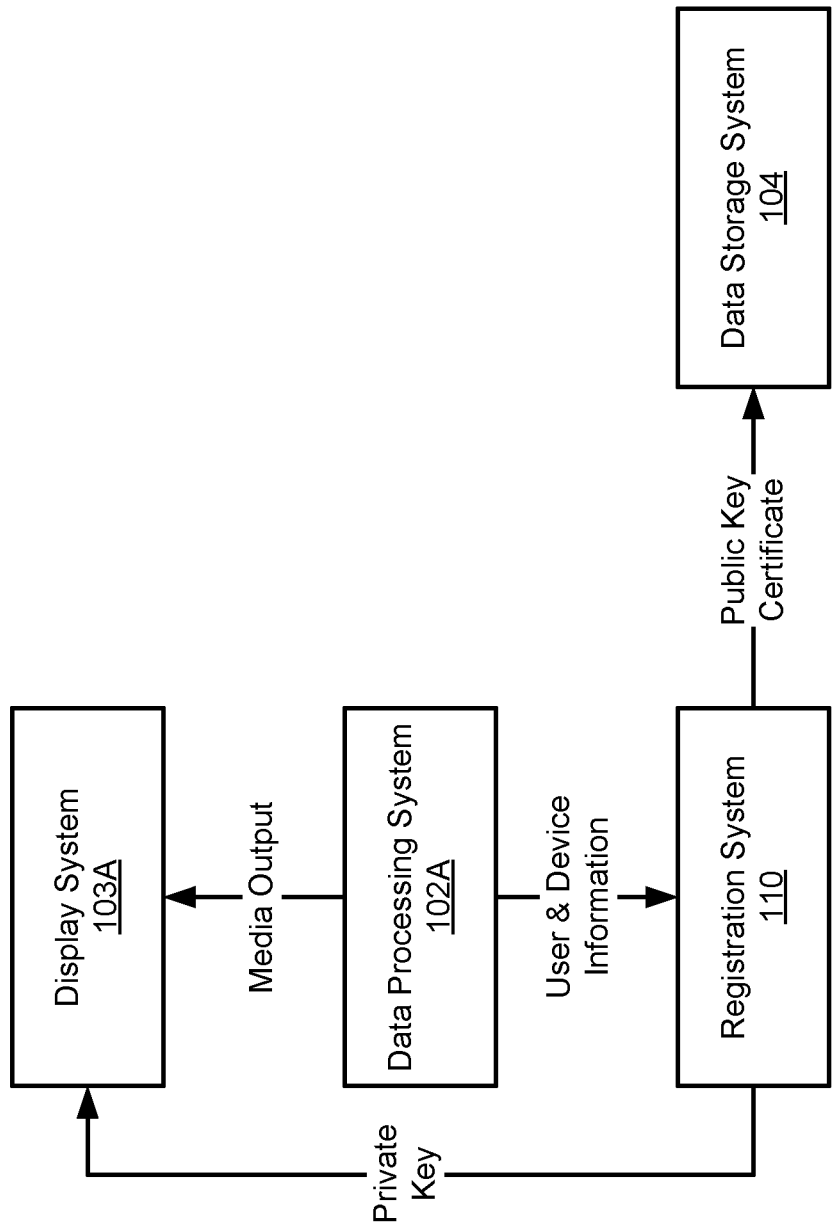
FIG. 2A shows a data flow diagram illustrating a security registration process in accordance with an embodiment.

To perform the registration processes, data storage system 104 may (i) receive user identification and/or device identification information (e.g., from a data processing system) thereby establishing a registered triple including a user, an end device, and an associated auxiliary device (e.g., a registered user-device combination), (ii) obtain cryptographic key pairs based on the user identification and device identification information (e.g., for each user-device combination), (iii) generate certificates (e.g., public key certificates for the validation of devices and/or systems), and/or (iv) provide the key pairs and/or certificates to devices (e.g., to the end device, the display device, and/or the data storage system) that may participate in the data access control system. Refer to FIG. 2A for additional details regarding registration processes.

To perform device-specific encryption and data redirection, data storage system 104 may (i) obtain data access requests for data from users of end devices, (ii) perform validations of the user, the end device, and an associated device (e.g., a display device associated with the end device that originated the access request) used by the user in making the data access request, (iii) when all validations are successful, encrypt the requested data (e.g., using a public key of a key pair established during registration of the user, the end device, and the display device), (iv) provide the encrypted data to the display device (as opposed to the end device), and/or (v) deny access requests for users or devices (e.g., one or more of them) that cannot be validated.

Figure 2B:
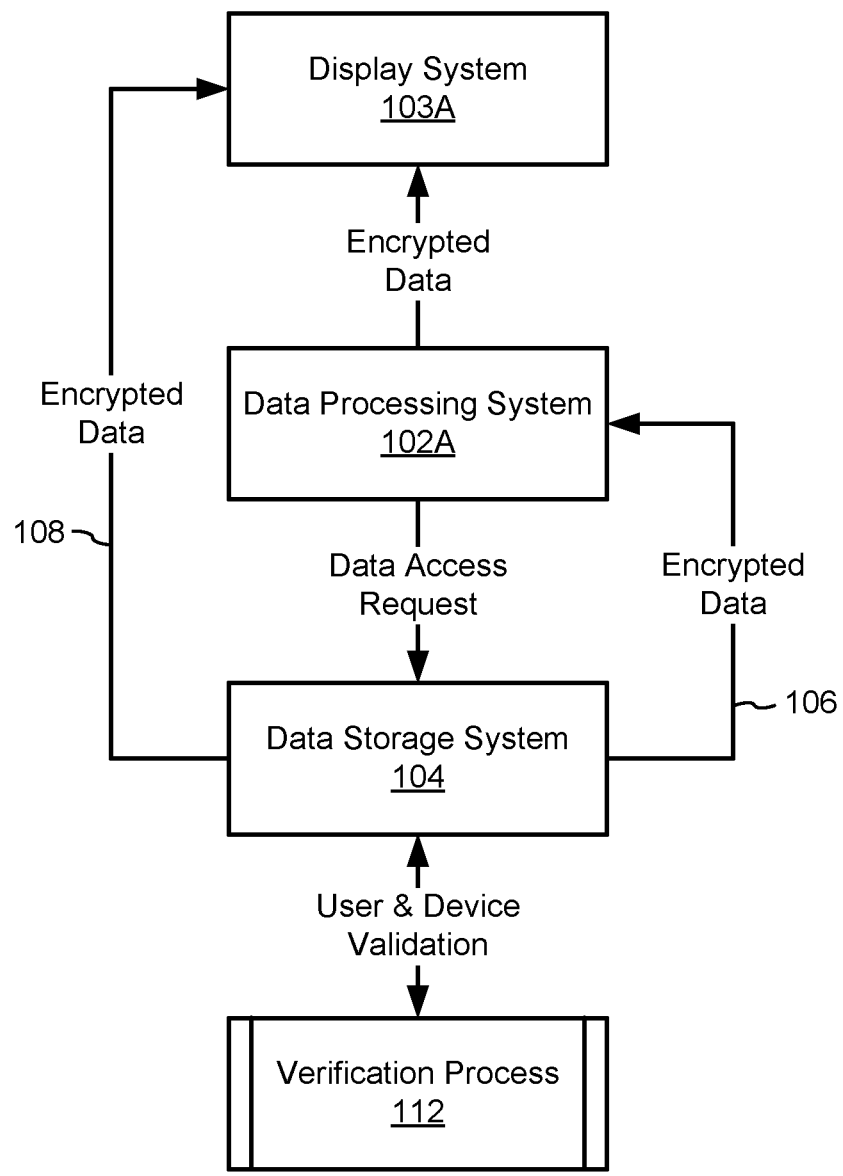
FIG. 2B shows a data flow diagram illustrating a process for managing access to data stored in a data storage system accordance with an embodiment.

For example, a display system of display systems 103 may receive data (e.g., input media) from data storage system 104 through operable connection 108. By providing the sensitive data to display systems 103 directly (e.g., circumventing data processing systems 102), in the event that one or more of data processing systems 102 are compromised (e.g., via spyware and/or malicious party access), the sensitive data may be screened from the malicious party. Refer to FIG. 2B for additional details regarding device-specific encryption and data redirection.

By doing so, a system in accordance with embodiments disclosed herein may provide a method for managing access to sensitive data by reducing and/or preventing access of the data by malicious parties that may leak the data and/or use the data for other purposes.

Figure 3:
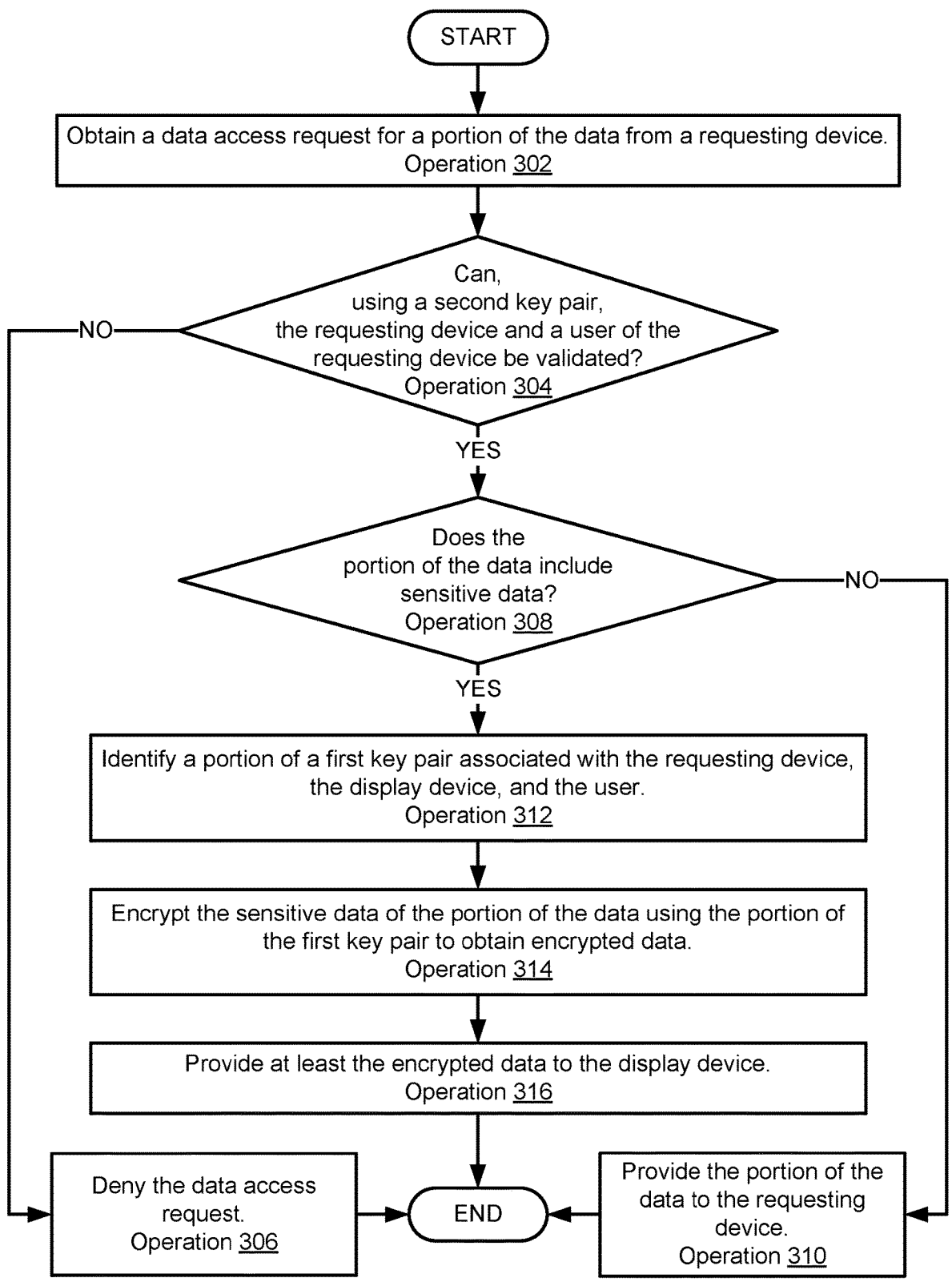
FIG. 3 shows a flow diagram illustrating a method of managing data access in accordance with an embodiment.

When providing its functionality, data storage system 104 may perform all, or a portion, of the method and/or actions shown in FIG. 3.

Data processing systems 102 and/or data storage system 104 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a first data flow diagram in accordance with an embodiment is shown. The data flow diagram may illustrate a security registration process performed by a system similar to that of FIG. 1. The security registration process may register, using a registration system, combinations of (i) a user (e.g., through recording user information), (ii) an end device (e.g., through recording end device information), and/or (iii) a display device (e.g., an auxiliary device) associated with the end device (e.g., through recording display device information).

To do so, data processing system 102A of data processing systems 102 may provide registration system 110 with information regarding authorized users and/or devices (e.g., end devices and/or display devices). For example, an auxiliary device such as display system 103A may be associated with (e.g., operably connected to) data processing system 102A and may receive media output for display from data processing system 102A.

Information such as user identifiers (e.g., usernames), security information for the user identifiers (cryptographically secure identifiers), end device and/or display device identifiers, security information for the end device and/or display device identifiers, etc. may be used by registration system 110 to link a cryptographic key pair to a specific combination of registered user and/or registered devices (e.g., end devices and/or display devices).

For example, once a user, an end device, and a display device associated with the end device are registered (e.g., the user and devices may be subject to any number of validation processes during the registration process), one or more key pairs may be generated for and/or be associated with the user-device combination.

Registration system 110 may (i) obtain key pairs and/or certificates from another device, (ii) generate key pairs and/or certificates, (iii) assign key pairs to user-device combinations, (iv) distribute key pairs to systems and/or devices (e.g., data processing system 102A, display system 103A, and/or data storage system 104), and/or (v) facilitate distribution of portions of key pairs. The key pairs may be associated with a user, a device, and/or a combination thereof, and may include a public key and a private key. The key pair associations (e.g., to users and devices) may be retained by registration system 110.

For example, during registration of data processing system 102A, a key pair may be generated, or a portion of a key pair (e.g., a public key) may be provided to registration system 110 by data processing system 102A. The public portion of the key pair may be provided as part of a certificate to data storage system 104 (and/or a certificate may be generated using the public portion). The certificate may be signed by a trusted entity (e.g., registration system 110).

Registration system 110 may be a part of data storage system 104 and/or may operate independently (e.g., may be a third-party registration system) from data storage system 104. Registration system 110 may distribute (e.g., transfer over an encrypted channel) a portion of the generated key pair (e.g., the public key) to data storage system 104, where the portion of the key pair may be stored. Another portion of the key pair (e.g., the private key) may be distributed securely to a registered display device (e.g., display system 103A) that is associated with a registered end device (e.g., data processing system 102A) and registered user (e.g., a user of data processing system 102A). The private key may then be stored on the registered display device, and the key pair may be used to encrypt and/or decrypt data transferred between data storage system 104 and the registered display device (e.g., display system 103A).

Any number of key pairs may be obtained, generated, and/or distributed for any number of user/end device combinations during the registration process. For example, registration system 110 may distribute the public key of a key pair to data storage system 104 and may provide the private key to data processing system 102A. This key pair may be used to in a validation process between data storage system 104 and data processing system 102A (e.g., to validate data access requests received by data storage system 104 from data processing system 102A).

Thus, as illustrated in FIG. 2A, the system of FIG. 1 may perform a security registration process that provides key pairs for user-device combinations. The key pairs may be used to authenticate and/or validate registered systems and encrypt sensitive data requested by registered users of the systems.

Turning to FIG. 2B, a second data flow diagram in accordance with an embodiment is shown. The data flow diagram may illustrate a process for managing access to data stored in a data storage system.

In order to access data from data storage system 104, data processing system 102A may send a data access request to data storage system 104. The request may be for a portion of data, which may include sensitive data. The data access request may include information regarding (i) the requesting end device (e.g., data processing system 102A), (ii) the user of the requesting device, (iii) the display device associated with the end device, and/or (iv) the portion of requested data. The data access request may be encrypted using a private key of a key pair assigned during registration of the user-device combination (e.g., the user, the end device, and the display device).

When the access request is received, data storage system 104 may initiate verification process 112 based on the information from the data access request. Verification process 112 may be performed by data storage system 104 and/or may be performed independently of data storage system 104 (e.g., by another device acting as an agent for data storage system 104).

Verification process 112 may include (i) attempting to validate the requesting device, (ii) attempting to validate the requesting user, and/or (iii) determining whether the user-device pair (e.g., data processing system 102A and a user thereof) can be authenticated based on the outcomes of the validation attempts. To attempt to validate the user, access credentials (e.g., passwords, other data usable to validate a user on a domain or other type of user-based computing environment) for the user may be used to ascertain whether the user is valid. For example, the combination of the username and access credentials may be forwarded to a domain controller for review, or may be otherwise used to attempt to validate the user.

To attempt to validate the requesting device, the encrypted access request may be attempted to be decrypted using the public key from the certificate (e.g., established during registration). If the decryption is successful, then the requesting device may be considered to have been validated (e.g., since only the requesting device should have access to the corresponding private key).

Once the requesting device and user are validated, verification process 112 may verify that a display device associated with the requesting device (e.g., display system 103A) is registered and associated with the user and the requesting device.

In the event that the user-device pair is validated, the portion of data may be prepared for transfer to the verified display device (e.g., display system 103A). If the portion of requested data includes sensitive data, the sensitive data may be encrypted. For example, the sensitive data may be encrypted by data storage system 104 using a public key of display system 103A (e.g., from the certificate established during registration). The requested data (e.g., with sensitive data being encrypted) may be transferred over a secure channel using a security protocol (e.g., mutual transport layer security) to data processing system 102A (e.g., via operable connection 106). Data processing system 102A may then transfer the requested data to display system 103A. Alternatively, the requested data may be transferred from data storage system 104 to display system 103A directly, bypassing the requesting device (e.g., data processing system 102A) via operable connection 108.

Thus, when received by one of data processing system 102A and/or display system 103A, the sensitive data may be encrypted and may not be accessible without being decrypted. Accordingly, if a malicious party has compromised data processing system 102A, the malicious party may not be able to access the sensitive data because the private key that may be used to decrypt the sensitive data may be stored on another device (e.g., display system 103A) that the malicious party may not have knowledge of and/or have access to.

The encrypted data may be decrypted by display system 103A using a private key (e.g., established during registration of the user-device combination). The decrypted data may then be accessed (e.g., viewed) on display system 103A by the validated user.

Thus, as illustrated in FIG. 2B, the system of FIG. 1 may manage data access requests for sensitive data through verification processes that may validate pre-registered user-device combinations to reduce the likelihood of the sensitive data being obtained or otherwise used by malicious parties.

As discussed above, the components of FIG. 1 may perform methods to manage access to sensitive data used by data processing systems that provide computer implemented services.

Turning to FIG. 3, a flow diagram illustrating a method of managing data access in accordance with an embodiment is shown. The method may be performed by the system of FIG. 1. Any of the operations described with respect to FIG. 3 may be performed in different orders, skipped, repeated, and/or be performed in a parallel or partially overlapping in time manner.

At operation 302, a data access request for a portion of data may be obtained from a requesting device. The data access request may be obtained, for example, by receiving the data access request from a data processing system. The data access request may be obtained by a data storage system via network communications between the data storage system and the data processing system.

The data access request may include information regarding the requesting device, a user of the requesting device, and a display device associated with (e.g., connected to) the requesting device. The data access request may be encrypted using a private key of a key pair established during a registration process.

Prior to obtaining the data access request, a registration process for the user, the requesting device, and the display device with respect to the data storage system may be performed. The registration process may register user-device combinations; that is, the devices (e.g., the requesting devices and the display device) and the user of the devices, in order to establish key pairs.

For example, a first key pair associated with the display device and the data storage device may be obtained by a registration system. Portions of the first key pair may be distributed to each of the display device and the data storage device. The data storage device may receive a public key certificate (e.g., based on the public key of the first key pair) associating the first public key certificate with the requesting device, the display device and the user.

A second key pair associated with the requesting device, the display device associated with the requesting device, and the user of the requesting device may be generated. Portions of the second key pair may be distributed to each of the requesting device and the data storage system (e.g., the data storage system may receive a second public key certificate based on the second public key of the second key pair). The second public key certificate may be used to facilitate validation of the second public key (e.g., validate the requesting device and/or data access requests received from the request device). Refer to the discussion of FIG. 2A for more information regarding the registration process.

At operation 304, a determination may be made regarding whether the requesting device and the user of the requesting device may be validated using the second key pair. The determination may be made by authenticating the user and the device independently, as described with respect to FIG. 2B. The authentication of the user may be made using password-based authentication, multi-factor authentication, biometric authentication, and/or endpoint authentication methods (e.g., media access control and/or physical device address verification). The requesting device may be validated by ascertaining whether the access request may be decrypted using the public key (e.g., of the second key pair) in a certificate established during registration of the user-device pair.

If at least one of the user and the requesting device cannot be validated (e.g., fail to be authenticated), the method may proceed to operation 306. If both the user and the requesting device are validated (e.g., successfully authenticated), the method may proceed to operation 308.

At operation 306, the data access request is denied. The data access request may be denied (i) by notifying the user of the requesting device of the denied access request, (ii) by refusing access to the requested portion of data, (iii) by discarding the access request without sending a notification, and/or (iv) via other methods.

The method may end following operation 306.

Returning to operation 304, the method may proceed to operation 308 following operation 304 when the user and requesting device can be validated.

At operation 308, a determination may be made regarding whether the portion of data includes sensitive data. The determination may be made by obtaining a classification of a sub-portion of the portion of requested data. The classification may describe the level of sensitivity of the sub-portion. The classification of a sub-portion of the requested data may be read from metadata of the sub-portion. The classification may be based on data content, data context, user judgement, may be generated using an artificial intelligence model trained to identify the level of sensitivity of data, and/or via other methods.

If the portion of the requested data does not include sensitive data, the method may proceed to operation 310. If the portion of the requested data does include sensitive data, the method may proceed to operation 312.

At operation 310, the portion of the data may be provided to the requesting device. The portion of the data may be provided to the requesting device by transferring the portion of data through a secure network channel established between the data storage system and the data processing system (e.g., end device). The provided portion may not be encrypted with any key pairs established during registration.

The method may end following operation 310.

Returning to operation 308, the method may proceed to operation 312 when the portion of the data includes sensitive data.

At operation 312, a portion of a first key pair associated with the requesting device, the display device, and the user is identified. The portion of the first key pair (e.g., established during the registration process) may be identified by accessing a key pair association database or a certificate.

The key pair database may associate identifiers of users, devices, and/or other information with keys for encrypting sensitive data. A key may be identified by performing a look-up in the key pair database based on information included in the data access request (e.g., identifying information regarding the requesting device, the display device associated with the requesting device and the user of the requesting device). The portion of the first key pair may be a public key (e.g., a public key certificate).

The first key pair may be identified by matching an identifier of the display device to a stored certificate. The stored certificate may validate that a public key of the certificate is known to be part of a key pair (e.g., the first key pair) associated with the display device. For example, the certificate may include a public key and the display device may store the corresponding private key.

At operation 314, the sensitive data of the portion of the data is encrypted using the first key pair to obtain encrypted data. The sensitive data may be encrypted using the portion of the first key pair identified in operation 312 (e.g., the public key of the display device). For example, plaintext (e.g., the sensitive data and/or other data used as an ingest for an encryption algorithm) may be encrypted using the public key (e.g., as a cypher, or establishing a cypher) to obtain encrypted data. During encryption, plaintext may be converted to ciphertext (e.g., encrypted data), securing the plaintext from malicious parties as it may only be decrypted by a trusted device that has access to the corresponding private key (e.g., stored on the display device).

At operation 316, at least the encrypted data is provided to the display device. The encrypted data obtained in operation 314 may be provided to the display device by transmitting the encrypted data (and/or unencrypted data) over a secure communication channel established between the data storage system and the display device (e.g., a transmission path that does not include the requesting device).

Alternatively, the data storage system may transmit the requested data (e.g., encrypted and/or unencrypted data) to the requesting device, where the data may not be decrypted. The requesting device may then transmit the requested data to the display device.

Once the requested data is received by the display device, the user may decrypt the encrypted portion of the requested data using the private key of the first key pair established during registration. The decryption may be automatic or may be an additional process that requires manual initiation by the user. Consequently, an additional layer of security for the sensitive data may be provided (e.g., malicious parties that have compromised the display device may not be able to decrypt the encrypted data unless the malicious party knows of the key pair and encryption process). Once decrypted by the display system (e.g., display device), the sensitive data may be viewed on the display device (e.g., accessed) by the user but may not be accessible by the requesting device that typically displays content on the display device. By decrypting the sensitive data using the display device, the sensitive data may be screened from the requesting device (e.g., and any malicious party that may have access to the requesting device).

The method may end following operation 316.

Thus, as illustrated above, embodiments disclosed herein may provide systems and methods usable to manage access to data stored in data storage systems. By managing access to the data, the likelihood of malicious parties gaining access to sensitive data stored in data storage systems may be reduced. By registering user-device combinations through a registration system, cryptographic keys (e.g., key pairs)

specific to the registered combinations (e.g., user, end device, and display device) may be used to employ multiple layers of security. As described, an access control system including user authentication, requesting device authentication, and display device-based encryption (e.g., circumventing the requesting device) may be implemented to prevent the exposure of sensitive data to malicious parties.

Thus, embodiments disclosed herein may provide an improved computing device that is able to reduce the likelihood of a malicious party intercepting accessed sensitive data. Accordingly, the disclosed process provides for both an embodiment in computing technology and an improved method for managing secure data access.

Figure 4:
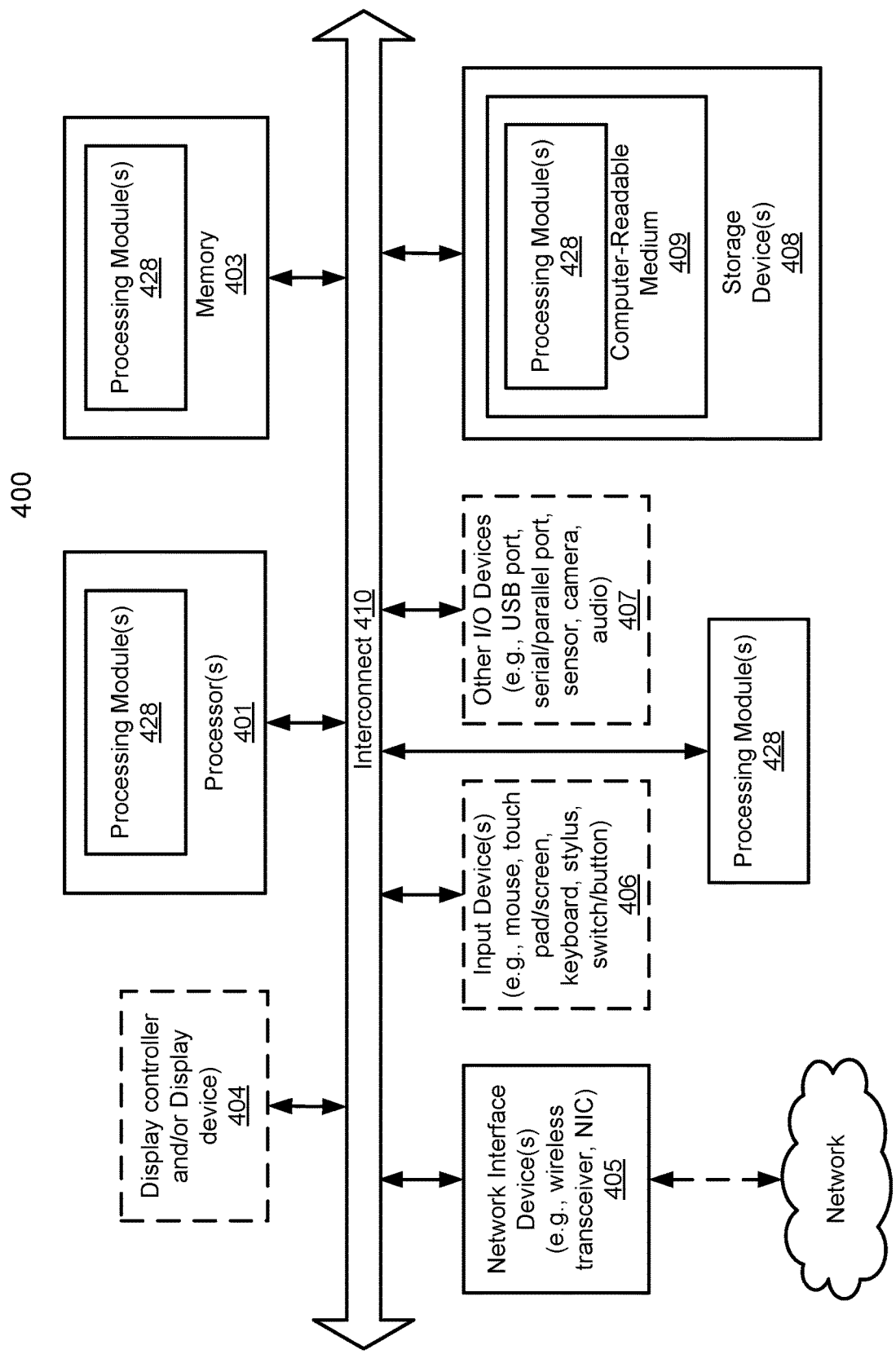
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to data stored in a data storage system, comprising:

by the data storage system:
obtaining a data access request for a portion of the data from a requesting device, the requesting device being a separate computing device from the data storage system;
making, using at least in part a second key pair, a first determination regarding whether the requesting device and a user of the requesting device can be validated, the second key pair being associated with the requesting device, a display device associated with the requesting device, and the user; and
in a first instance of the first determination, where both the requesting device and the user are validated:
making a second determination regarding whether the portion of the data comprises sensitive data, and
in a first instance of the second determination, where the portion of the data comprises the sensitive data:
identifying a portion of a first key pair associated with the requesting device, the display device, and the user;
encrypting the sensitive data of the portion of the data using the portion of the first key pair to obtain encrypted data; and
providing at least the encrypted data to the display device, to provide the user with access to the sensitive data and screen the sensitive data from the requesting device.

2. The method of claim 1, further comprising and by the data storage system:
prior to obtaining the data access request:
performing a registration process for the user, the requesting device, and the display device with respect to the data storage system, the registration process obtaining the first key pair and the second key pair, and distributing portions of the first key pair to the display device and the data storage system, and distributing portions of the second key pair to the requesting device and the data storage system.

3. The method of claim 2, wherein distributing the portions of the first key pair comprises:
obtaining a first public key certificate based on a first public key of the first key pair; and
providing the first public key certificate to the data storage system, the data storage system associating the first public key certificate with the requesting device, the display device, and the user.

4. The method of claim 3, wherein the first key pair is established through the registration process of the display device with the data storage system.

5. The method of claim 4, wherein the portion of the second key pair comprises a second public key stored in a second public key certificate, the second public key certificate facilitating validation of the second public key.

6. The method of claim 1, wherein providing the at least the encrypted data to the display device comprises transmitting the at least the encrypted data via a direct transmission path between the data storage system and the display device that does not comprise the requesting device.

7. The method of claim 1, wherein the display device is registered with the data storage system prior to obtaining the data access request.

8. The method of claim 1, wherein providing at least the encrypted data comprises sending the encrypted data via a secure communication channel established between the data storage system and the display device, the secure communication channel utilizing a mutual transport layer security protocol.

9. The method of claim 1, further comprising:
in a second instance of the first determination, where at least one of the requesting device and the user are not validated, denying the data access request.

10. The method of claim 1, further comprising:
in a second instance of the second determination, where the portion of the data does not comprise the sensitive data, providing the portion of the data to the requesting device.

11. The method of claim 1, wherein the encrypted data is decrypted directly by the display device using a first private key of the first key pair stored within the display device, the display device being a separate computing device from both the data storage system and the requesting device.

12. A non-transitory machine-readable medium having instructions stored therein, which when executed by a processor of a data storage system, cause the processor of the data storage system to perform operations for managing access to data stored in the data storage system, the operations comprising:
obtaining a data access request for a portion of the data from a requesting device, the requesting device being a separate computing device from the data storage system;
making, using at least in part a second key pair, a first determination regarding whether the requesting device and a user of the requesting device can be validated, the second key pair being associated with the requesting device, a display device associated with the requesting device, and the user; and
in a first instance of the first determination, where both the requesting device and the user are validated:
making a second determination regarding whether the portion of the data comprises sensitive data, and
in a first instance of the second determination, where the portion of the data comprises the sensitive data:
identifying a portion of a first key pair associated with the requesting device, the display device, and the user;
encrypting the sensitive data of the portion of the data using the portion of the first key pair to obtain encrypted data; and
providing at least the encrypted data to the display device, to provide the user with access to the sensitive data and screen the sensitive data from the requesting device.

13. The non-transitory machine-readable medium of claim 12, the operations further comprising:
prior to obtaining the data access request:
performing a registration process for the user, the requesting device, and the display device with respect to the data storage system, the registration process obtaining the first key pair and the second key pair, and distributing portions of the first key pair to the display device and the data storage system, and distributing portions of the second key pair to the requesting device and the data storage system.

14. The non-transitory machine-readable medium of claim 13, wherein distributing the portions of the first key pair comprises:
obtaining a first public key certificate based on a first public key of the first key pair; and
providing the first public key certificate to the data storage system, the data storage system associating the first public key certificate with the requesting device, the display device, and the user.

15. The non-transitory machine-readable medium of claim 14, wherein the first key pair is established through the registration process of the display device with the data storage system.

16. The non-transitory machine-readable medium of claim 15, wherein the portion of the second key pair comprises a second public key stored in a second public key certificate, the second public key certificate facilitating validation of the second public key.

17. A data processing system configured as a data storage system, comprising:
a processor; and
a memory coupled to the processor to store instructions, which when executed by the processor, cause the processor to perform operations for managing access to data stored in the data storage system, the operations comprising:
obtaining a data access request for a portion of the data from a requesting device, the requesting device being a separate computing device from the data storage system,
making, using at least in part a second key pair, a first determination regarding whether the requesting device and a user of the requesting device can be validated, the second key pair being associated with the requesting device, a display device associated with the requesting device, and the user, and
in a first instance of the first determination, where both the requesting device and the user are validated:
making a second determination regarding whether the portion of the data comprises sensitive data; and
in a first instance of the second determination, where the portion of the data comprises the sensitive data:
identifying a portion of a first key pair associated with the requesting device, the display device, and the user,
encrypting the sensitive data of the portion of the data using the portion of the first key pair to obtain encrypted data, and
providing at least the encrypted data to the display device, to provide the user with access to the sensitive data and screen the sensitive data from the requesting device.

18. The data processing system of claim 17, the operations further comprising:
prior to obtaining the data access request:
performing a registration process for the user, the requesting device, and the display device with respect to the data storage system, the registration process obtaining the first key pair and the second key pair, and distributing portions of the first key pair to the display device and the data storage system, and distributing portions of the second key pair to the requesting device and the data storage system.

19. The data processing system of claim 18, wherein distributing the portions of the first key pair comprises:
obtaining a first public key certificate based on a first public key of the first key pair; and
providing the first public key certificate to the data storage system, the data storage system associating the first public key certificate with the requesting device, the display device, and the user.

20. The data processing system of claim 19, wherein the first key pair is established through the registration process of the display device with the data storage system.

* * * * *